United States Patent
Syrman et al.

(10) Patent No.: US 8,207,700 B2
(45) Date of Patent: Jun. 26, 2012

(54) ELECTRIC MOTOR DRIVE

(75) Inventors: Timo Syrman, Hyvinkää (FI); Ari Kattainen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 238 days.

(21) Appl. No.: 12/693,134

(22) Filed: Jan. 25, 2010

(65) Prior Publication Data

US 2010/0219022 A1    Sep. 2, 2010

Related U.S. Application Data

(63) Continuation of application No. PCT/FI2008/000088, filed on Jul. 14, 2008.

(30) Foreign Application Priority Data

Jul. 26, 2007  (FI) ...................................... 20070571

(51) Int. Cl.
*H02P 25/00* (2006.01)

(52) U.S. Cl. ........ 318/807; 318/757; 318/759; 318/762; 318/375; 318/801; 318/802; 187/288; 198/323; 198/330; 198/322; 361/154; 290/52; 290/38 R

(58) Field of Classification Search .................. 318/757, 318/759, 762, 375, 801, 802, 807; 187/288; 198/323, 330, 322; 361/154; 290/52, 38 R
See application file for complete search history.

(56) References Cited

U.S. PATENT DOCUMENTS

| | | | |
|---|---|---|---|
| 3,678,353 A | 7/1972 | Marchi | |
| 3,678,358 A * | 7/1972 | Kolatorowicz | 318/400.22 |
| 3,764,815 A | 10/1973 | Habock et al. | |
| 4,422,817 A * | 12/1983 | Little | 414/421 |
| 4,484,127 A * | 11/1984 | Salihi et al. | 318/802 |
| 4,503,940 A * | 3/1985 | Watanabe | 187/290 |
| 4,712,054 A * | 12/1987 | Boldt | 318/758 |
| 5,070,290 A * | 12/1991 | Iwasa et al. | 318/758 |
| 5,247,140 A | 9/1993 | Iwasa et al. | |
| 5,457,372 A * | 10/1995 | Pignatelli et al. | 318/760 |
| 6,273,234 B1 * | 8/2001 | Balzer-Apke et al. | 198/323 |
| 7,268,514 B2 * | 9/2007 | DeLange et al. | 318/757 |
| 7,549,515 B2 * | 6/2009 | Tegtmeier et al. | 187/288 |
| 7,681,693 B2 * | 3/2010 | Tegtmeier et al. | 187/288 |
| 7,775,327 B2 * | 8/2010 | Abraham et al. | 187/288 |
| 2003/0057927 A1 | 3/2003 | Donat | |
| 2003/0150690 A1 | 8/2003 | Wiesinger et al. | |
| 2003/0150691 A1 | 8/2003 | Wiesinger et al. | |
| 2007/0187185 A1 | 8/2007 | Abraham et al. | |

FOREIGN PATENT DOCUMENTS

| | | |
|---|---|---|
| JP | 8-317678 A | 11/1996 |
| WO | WO-2005/073119 A1 | 8/2005 |
| WO | WO-2005/073121 A1 | 8/2005 |

* cited by examiner

*Primary Examiner* — Rita Leykin

(74) *Attorney, Agent, or Firm* — Birch, Stewart, Kolasch & Birch, LLP.

(57) ABSTRACT

The invention relates to a switch arrangement of an electric motor drive (1). The electric motor drive comprises safety switches (3) determined by the safety of the drive, a controlled mechanical brake (4), a power supply circuit (5) of the brake control, a power converter (6), which power converter comprises a network rectifier (7) and a power rectifier (8) of the motor. The power rectifier of the motor is at least partly implemented with controlled semiconductor switches (9, 10) arranged into a bridge. The power converter comprises an intermediate circuit (11, 12) between the network rectifier and the power rectifier of the motor. The switch arrangement comprises normally-open switches (13, 14) in the intermediate circuit of the power converter (6).

20 Claims, 3 Drawing Sheets

US 8,207,700 B2

ELECTRIC MOTOR DRIVE

Figure 1:
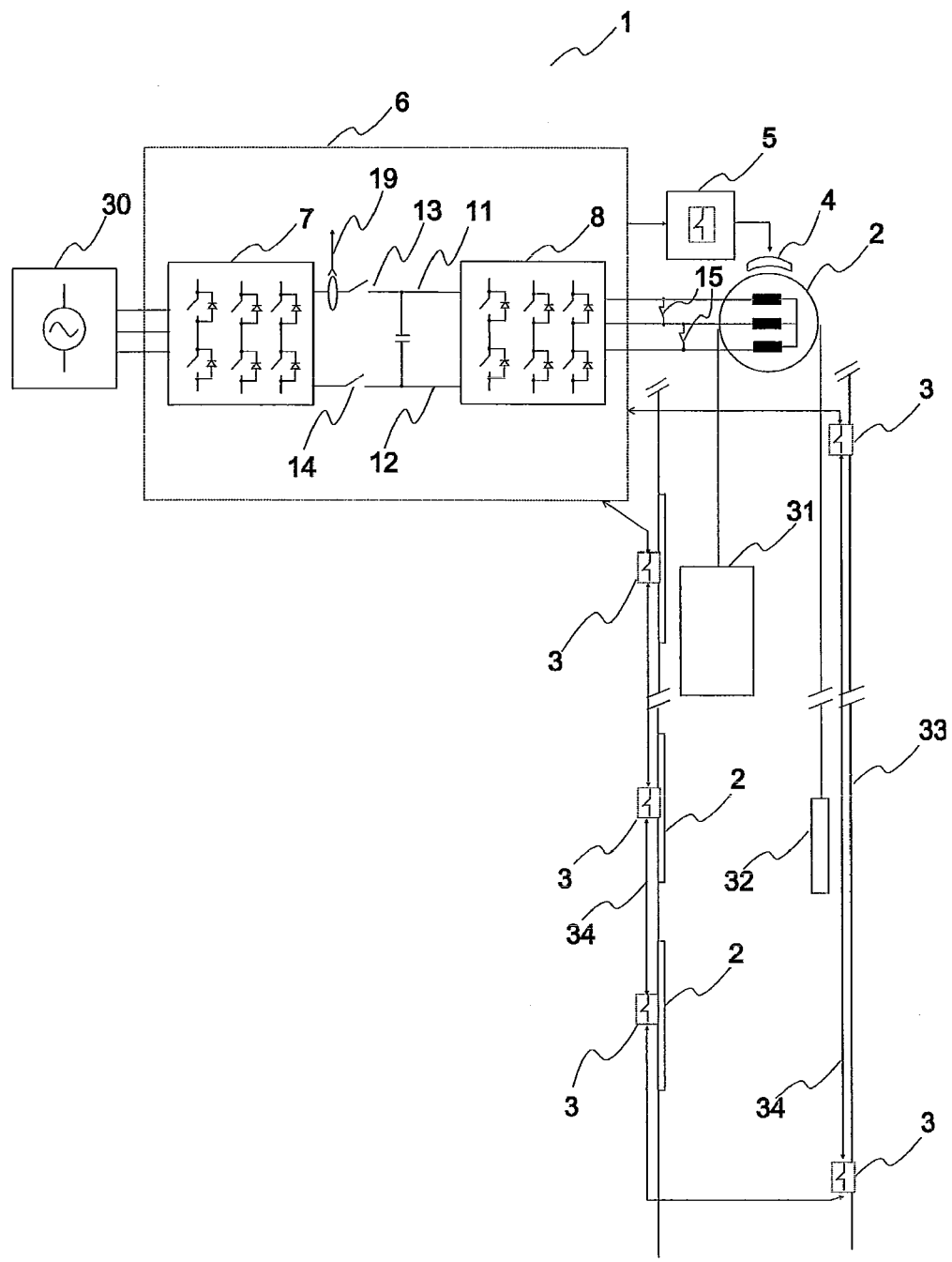

This application is a Continuation of copending PCT International Application No. PCT/FI2008/000088 filed on Jul. 14, 2008, and for which priority is claimed under 35 U.S.C. §120; and this application claims priority of Application No. 20070571 filed in Finland on Jul. 26, 2007 under 35 U.S.C. §119; the entire contents of all are hereby incorporated by reference into the present application.

FIELD OF THE INVENTION

The invention is directed to the field of electric motor drives, and specifically to a switch arrangement for an electric motor drive.

PRIOR ART

With an electric motor drive, power is supplied between a power source, such as a network voltage supply, and an electric motor. A frequency converter, for example, with which the flow of power to the motor is controlled, is used for the power supply. The power supply to the motor is disconnected usually with contactors connected in series between the frequency converter and the network voltage supply. The safety of the electric motor drive necessitates disconnection of the power supply at all poles. For example, a contactor containing three disconnecting switches is thus needed for disconnection of all the phases in the case of a three-phase network.

PURPOSE OF THE INVENTION

The purpose of the invention is to disclose a switch arrangement of an electric motor drive, in which the number of switches needed is smaller than in prior art. The purpose of the invention is also to disclose a switch arrangement, in which in particular the switches disconnecting the intermediate circuit are arranged to open when de-energized, in which case the lifetime of the switches lengthens and smaller switches can be used. The invention also contains the concept of disconnecting the flow of current between the power source and the motor with two different methods, in which case the flow of current creating torque on the motor disconnects reliably also in a fault situation.

CHARACTERISTIC FEATURES OF THE INVENTION

The electric motor drive, and other features, according to the invention are characterized by what is disclosed in the claims. Some inventive embodiments are also discloses in the descriptive section of the present application. The inventive content of the application can also be defined differently than in the claims presented below. The inventive content may also consist of several separate inventions, especially if the invention is considered in the light of expressions or implicit subtasks or from the point of view of advantages or categories of advantages achieved. In this case, some of the attributes contained in the claims below may be superfluous from the point of view of separate inventive concepts.

The electric motor drive according to the invention for using an AC or a DC electric motor comprises safety switches determined by the safety of the electric motor drive, a controlled mechanical brake, as well as a power supply circuit of the brake control, a power converter, which power converter comprises a network rectifier and a power rectifier of the motor, which power rectifier of the motor is at least partly implemented with controlled semiconductor switches arranged into a bridge. The power converter comprises an intermediate circuit between the network rectifier and the power rectifier of the motor. The electric motor drive comprises a switch arrangement, which switch arrangement comprises normally-open switches in the intermediate circuit of the power converter, of which the first switch is connected in series to the positive intermediate circuit busbar between the output of the network rectifier and the input of the power rectifier of the motor, and the second switch is connected in series to the negative intermediate circuit busbar between the output of the network rectifier and the input of the power rectifier of the motor. One power rectifier of the motor according to the invention comprises a quick-stop switch as well as an amplifier circuit connected to the control pole of the controlled semiconductor switch, the electricity supply of which is arranged to occur via the aforementioned quick-stop switch. The semiconductor switch is in this case fitted to switch into a conductive state when the amplifier circuit is in a controlled active state. The amplifier circuit supplied via the aforementioned quick-stop switch is fitted alternatively either in connection with the controlled semiconductor switches connected to the positive intermediate circuit busbar, in connection with the controlled semiconductor switches connected to the negative intermediate circuit busbar or in connection with the controlled semiconductor switches connected to both the positive and the negative intermediate circuit busbar.

A normally-open switch means in this context a switch, the active control of which closes the poles of the switch, allowing a current flow through the switch. This kind of switch can be, for instance, a contactor containing a control coil. The contactor is controlled by supplying current to the control coil, in which case the normally-open switches close. If the control of the aforementioned normally-open switches is disconnected, the switches open, in which case the intermediate circuit is disconnected. Since these switches are fitted both to the positive and to the negative intermediate circuit busbar, the intermediate circuit is disconnected at all poles.

A machinery brake engaging on, for instance, the stator of the motor or on the traction sheave, can function as the controlled mechanical brake of the electric motor drive. Also, e.g. in elevator use, a car brake that engages on the guide rail of the elevator car can also function as the brake. The electric motor drive can also contain both the aforementioned brakes.

A power converter refers to an appliance that supplies power between a power source and an electric motor. This kind of power converter is e.g. a frequency converter, when an inverter rectifier is the power converter of the motor, with which AC voltage or AC current is supplied to an AC electric motor. A DC electric motor can also be used as an electric motor, in which case for instance an H-bridge circuit is the power rectifier of the motor, with which DC voltage or DC current is supplied to the electric motor.

The network rectifier according to the invention can be e.g. a DC rectifier implemented as a diode bridge, in which case a flow of current is possible only from the power source towards the electric motor. The network rectifier can also be a network inverter rectifier comprising controlled switches, in which case a flow of current is possible in both directions between the power source and the electric motor.

One switch arrangement according to the invention comprises normally-closed switches, which normally-closed switches are connected in parallel between the phases of the motor.

A normally-closed switch means in this context a switch, the active control of which opens the poles of the switch, preventing the flow of current through the switch. If the control of the aforementioned normally-closed switches is disconnected, the switches close and the phases of the motor are connected into a short-circuit. If in this case the motor starts to move, the source voltage induced in the stator windings short-circuits via the switches connected in parallel and produces a current that brakes the motor. This is called dynamic braking. If the electric motor is a DC electric motor, one normally-closed switch fitted between the poles of the stator is sufficient to short-circuit the poles of the stator.

One power converter according to the invention is a frequency converter, in which case the power rectifier of the motor is an inverter rectifier. The frequency converter comprises in this case a network rectifier, an inverter rectifier and an intermediate circuit between these.

One power rectifier of the motor according to the invention comprises a quick-stop switch, as well as an amplifier circuit, the electricity supply of which is arranged to occur via the aforementioned quick-stop switch, connected to the control pole of the controlled semiconductor switch. In this case the semiconductor switch is fitted to switch into a conductive state when the amplifier circuit is in a controlled active state. The amplifier circuit supplied via the aforementioned quick-stop switch is in this case fitted alternatively either in connection with the controlled semiconductor switches connected to the positive intermediate circuit busbar, in connection with the controlled semiconductor switches connected to the negative intermediate circuit busbar or in connection with the controlled semiconductor switches connected both to the positive and the negative intermediate circuit busbar.

If the quick-stop switch is disposed e.g. in connection with the controlled semiconductor switches connected to only the positive intermediate circuit busbar, it is possible to control the controlled semiconductor switches connected to the negative intermediate circuit busbar simultaneously into a conductive state, in which case there is the possibility of preventing power supply from the power source to the electric motor with the switches connected to the positive intermediate circuit busbar, and it is possible with the switches connected to the negative intermediate circuit busbar to simultaneously achieve dynamic braking occurring via the controlled semiconductor switches.

One power converter according to the invention comprises measurement of the status of the safety switch, measurement of the status of the quick-stop switch, a control of the semiconductor switches of the power rectifier of the motor, a control of the normally-open switches fitted to the intermediate circuit as well as possibly a measurement of the intermediate circuit current. In this embodiment of the invention the power converter is fitted to disconnect control of the aforementioned normally-open switches fitted to the intermediate circuit when at least one of the following conditions is fulfilled: measurement of the status of the quick-stop switch indicates that the switch has opened; measurement of the intermediate circuit current indicates that the absolute value of the intermediate circuit current has decreased to below the pre-defined limit value of current; measurement of the status of the safety switch of the electric motor drive indicates that the safety switch has opened; the power converter has disconnected current in the power rectifier of the motor with the control of the semiconductor switches of the power rectifier.

In one electric motor drive according to the invention the power rectifier of the motor comprises a switch that permits starting and the power converter comprises measurement of the status of the switch that permits starting. The power converter is in this case fitted to start the supply of current to the electric motor by controlling the semiconductor switches of the power rectifier of the motor on the basis of the measurement of the status of the switch that permits starting.

In one electric motor drive according to the invention the power supply circuit of the brake control comprises a DC inverter, in the input of which is a power source and to the output of which is fitted the coil of a mechanical brake. In this case at least one controlled brake control switch is connected in series to the power supply circuit of the brake control. In this embodiment of the invention the power converter comprises the control of the aforementioned controlled brake control switch, and the power converter is fitted to read the status of at least one safety switch and to control on the basis of the switch read the aforementioned controlled brake control switch.

In one electric motor drive according to the invention the aforementioned normally-open switches fitted to the intermediate circuit, the normally-closed switches fitted between the phases of the motor, the brake control switches, the switch that permits starting as well as the quick-stop switch form one or more switch modules, such as relay modules or contactor modules, of which each switch module has a common control coil. The switches of the switch module are in this case fitted to open or to close according to the control of the aforementioned common control coil.

In one embodiment of the invention at least the normally-closed switches fitted between the phases of the motor, the normally-open switches fitted to the intermediate circuit, the switch that permits starting and the brake control switch belong to the same switch module.

In one electric motor drive according to the invention the power converter comprises the control of the switch module, and the power converter is fitted to read the status of at least one safety switch and to control at least one control coil of the switch module on the basis of the status of the safety switch.

One electric motor drive according to the invention comprises a delay circuit. In this embodiment of the invention at least two safety switches are connected in series, the control coil of the quick-stop switch is connected directly to the serial circuit of the safety switches, and the switch module containing the normally-closed switches fitted between the phases of the motor, the normally-open switches fitted to the intermediate circuit, the switch that permits starting as well as the brake control switch is controlled via the delay circuit.

The electric motor drive according to the invention is preferably the motor drive of some transport system, such as an elevator motor drive, a crane drive, an escalator drive or a travelator drive.

ADVANTAGES OF THE INVENTION

With the invention at least one of the following advantages is achieved:
When the switches that close the intermediate circuit as well as the switches that open the phases of the motor are fitted into the main circuit of the power converter as described in the invention, the number of switches needed decreases compared to the situation in which the switches disconnecting the main circuit are disposed on the network side, between the network supply and the network rectifier. In this case it is possible to manage with a smaller number of switches/switch modules, which simplifies the electric motor drive, increases reliability and reduces costs.
When the motor current is disconnected in the power rectifier of the motor with the quick-stop switch before disconnection of the control of the normally-open switches fitted to the intermediate circuit of the power converter, these normally-open switches do not need to disconnect the motor current when they open, which increases the lifetime of the switches. In this case it is also possible to manage with normally-open switches that are smaller in their dimensions and cheaper. For example, the dimensioning of contactors and relays is affected to a significant extent by their capability of disconnecting the DC intermediate circuit current. Reduction of the size of the switches is useful especially in the motor drives of transport systems, such as in elevator drives, in which a part of the motor drive can be disposed in the elevator shaft or in connection with the landing door, in which case a large size of the drive would be a problem. For example the aim in modern elevator systems without machine rooms is to reduce the size of the electric motor drive.

When the current paths in both the positive and the negative intermediate circuit busbars are disconnected with normally-open switches as described in the invention, the power rectifier of the motor and the electric motor consecutive to it become isolated from the power source at all the poles, which is a requirement in particular for the electric motor drives of transport systems. In transport systems it must be possible in a fault situation to ensure disconnection of the power flow from the power source to the motor moving the transport appliance. At the same time the risk of ground contact in the main circuit of the power rectifier of the motor and of the motor decreases.

The normally-closed switches connected in parallel between the phases of the motor form a current path during dynamic braking of the electric motor. With dynamic braking it is ensured that the speed of the transport appliance does not start to accelerate out of control e.g. in a situation when the mechanical brake is opened manually. If the excitation of the electric motor is effected with permanent magnets, dynamic braking also works in a situation where the power supply to the electric motor drive is disconnected.

When the brake control switch is fitted into the same switch module with the normally-open switches fitted to the intermediate circuit that disconnect the electricity supply of the main circuit of the power converter, it is possible to disconnect the power supply to the electric motor as well as to prevent movement of the electric motor with a mechanical brake with the same control, which simplifies the safety-critical control of the electric motor drive, in which case the reliability of this safety-critical control improves.

Since the switch that permits the starting of the power rectifier of the motor is disposed in the same switch module with the normally-open switches that disconnect the electricity supply of the main circuit, it is possible to ensure by measuring the status of the switch that permits starting that the main circuit has closed before starting to supply power to the electric motor.

When the quick-stop switch and the normally-open switches fitted to the intermediate circuit are in different switch modules, and thus possess separate, independent controls, the safety of the electric motor drive improves, because malfunction of an individual switch/switch module or of a control of it will still not prevent disconnection of the power supply of the electric motor.

PRESENTATION OF DRAWINGS

Figure 2:
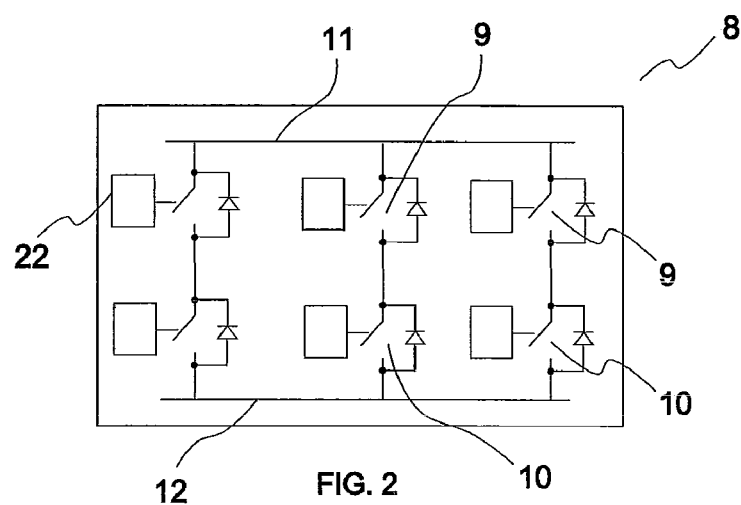
Figure 3:
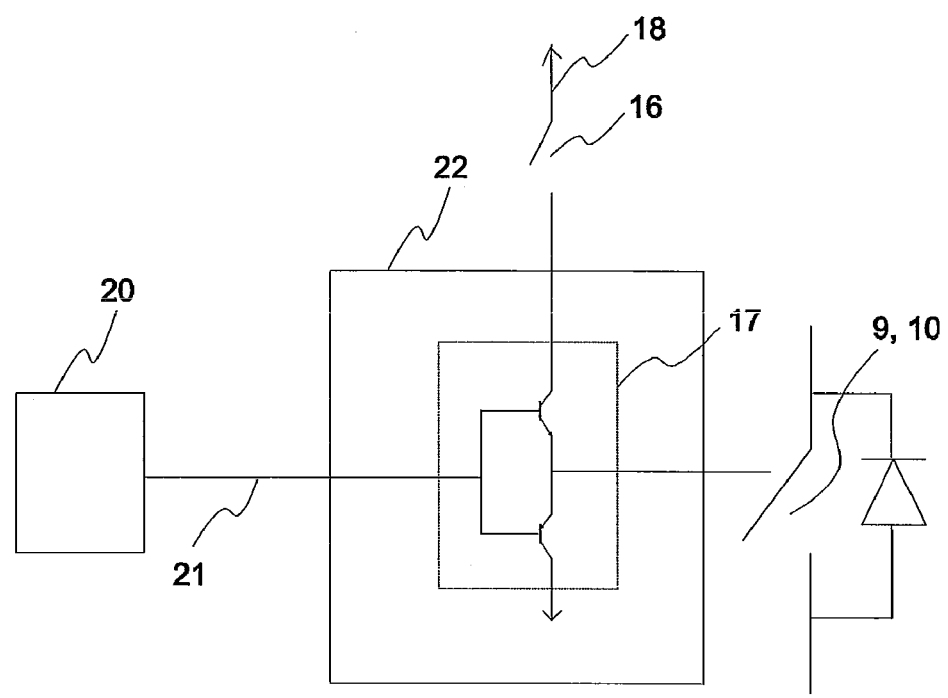
Figure 4:
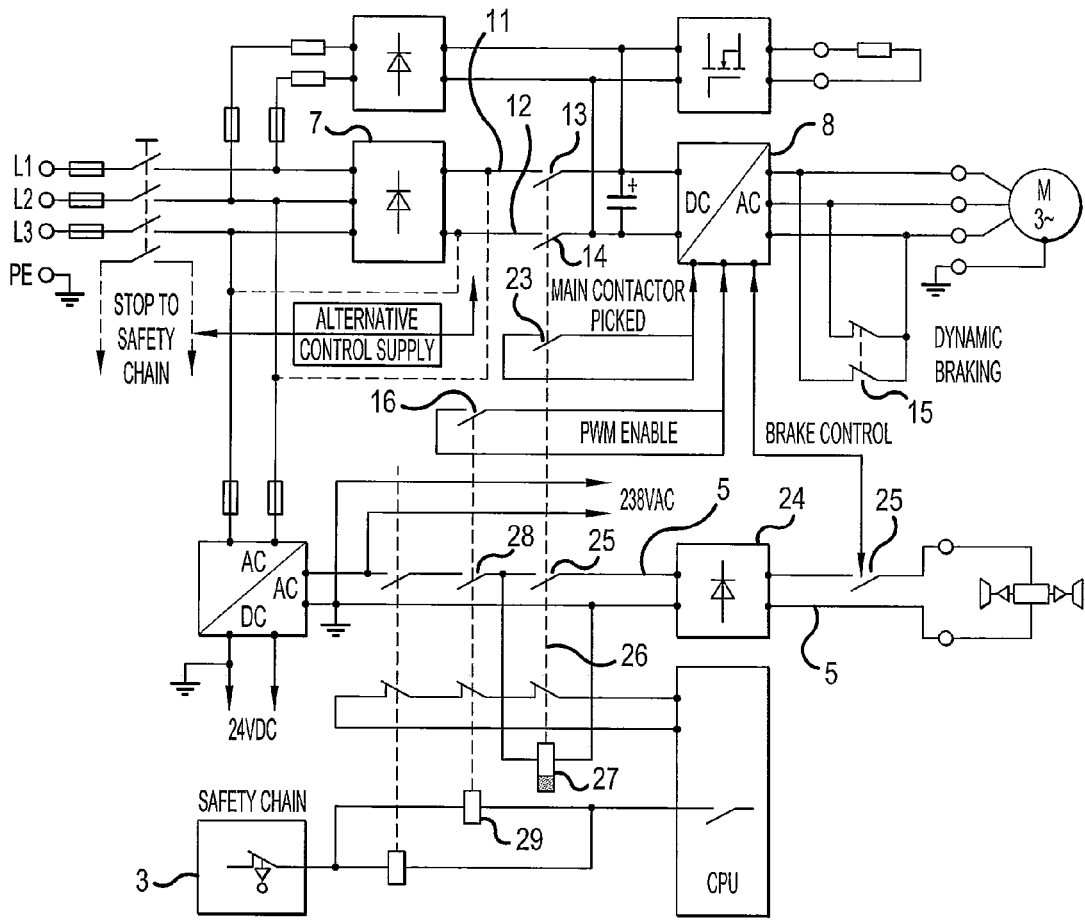

FIG. 1 presents an electric motor drive of an elevator system according to the invention FIG. 2 presents an inverter rectifier according to the invention FIG. 3 presents a detail in one inverter rectifier according to the invention FIG. 4 presents a detail of the kind of electrification of an elevator system, which contains an electric motor drive according to the invention

EMBODIMENTS

In the following the invention will be illustrated with the aid of embodiments that apply to an electric motor drive of an elevator system.

FIG. 1 presents an electric motor drive of an elevator system according to the invention. In the electric motor drive 1 the electric motor 2, which moves the elevator car 31 in the elevator shaft 33, is controlled. The movement of the elevator car in the elevator shaft can be stopped with mechanical stopping appliances, such as with a machinery brake 4 or a car brake (not in diagram). The machinery brake is controlled by supplying current to the control winding of the machinery brake with a power supply circuit 5. Safety switches 3 are disposed in the points that are important from the standpoint of the safety of the elevator system. These points are e.g. the landing doors as well as the end limits at the top end and bottom end of the elevator shaft. The electric motor is controlled with a frequency converter 6. The three-phase network voltage 30 is rectified with a network inverter rectifier 7 to the intermediate circuit of the frequency converter, which comprises a positive intermediate circuit busbar 11 and a negative intermediate circuit busbar 12. The rectified intermediate circuit voltage is transformed into variable-amplitude and variable-frequency voltage the phases of the electric motor with the inverter rectifier 8. The power supply from the network 30 to the electric motor 2 can be disconnected with the normally-open switches 13, 14 connected in series to the positive and the negative intermediate circuit busbar. The phases of the motor can be short-circuited for dynamic braking with the normally-closed switches 15 connected in parallel with the phases.

The frequency converter reads the status of the serial circuit 34 of the safety switches 3. On the basis of the status the frequency converter deduces the operating status of the elevator system, and if necessary disconnects the power supply to the motor 2 by disconnecting the control of the normally-open switches 13, 14 fitted to the intermediate circuit, in which case the switches open. In addition the frequency converter can interrupt the power supply to the motor by interrupting current supply to the inverter rectifier 8. Furthermore the frequency converter can disconnect the power supply to the machinery brake and/or the car brake by opening the power supply circuit 5 of the brake.

The safety switches 3 are here connected in series, in which case the connection interface to the frequency converter is as simple as possible, but the safety switches can also be read separately, e.g. by leading the safety switches to be read directly to the frequency converter or by reading the status of the switches via a separate serial communications bus.

FIG. 2 presents an inverter rectifier according to the invention. The inverter rectifier comprises switches connected in series by pairs, which are in this case IGBT transistors. Anti-parallel diodes are connected in parallel with the switches, which prevent power supply from the DC intermediate circuit to the electric motor when the IGBT transistors are not controlled.

FIG. 3 presents a detail of the inverter rectifier according to FIG. 2. An amplifier circuit 17 is fitted in connection with the control pole of the IGBT transistor 9, 10. Electricity is supplied to the amplifier circuit from the voltage source 18 via the quick-stop switch 16 such that the electricity supply of the amplifier disconnects when the quick-stop switch 16 opens. The quick-stop switch is a normally-open switch, so that the switch opens when its control is disconnected. The IGBT transistors 9, 10 are controlled with the control 20 of the frequency converter such that the amplifier circuit is controlled with the control signal 21, which in turn controls the IGBT transistor into a conductive state when the gate of the IGBT transistor in the output of the amplifier circuit 17 has the positive voltage of the voltage source 18, typically 15 volts with respect to the emitter of the IGBT transistor, and also controls the IGBT transistor into a non-conductive state when the gate of the IGBT transistor in the output of the amplifier circuit 17 has the negative voltage of the voltage source 18, typically −5 volts with respect to the emitter of the IGBT transistor. The amplifier circuit is said to be in a controlled active state when the quick-stop switch 16 is closed, enabling power supply to the amplifier circuit 17, and simultaneously the positive voltage of the voltage source 18 is in the output of the amplifier circuit 17 and on the gate of the IGBT transistor, in other words the power supply occurring via the amplifier circuit enables switching of the IGBT transistor into a conductive state.

FIG. 4 presents a detail of the electrification of an elevator system, when an electric motor drive according to the invention is fitted to an elevator system. The normally-closed switches 15 connected in parallel with the phases of the motor, the switch 23 that permits starting (main contactor picked) and also the brake control switch 25 are fitted into the same contactor module 26 with the normally-open switches 13, 14 fitted to the intermediate circuit. The quick-stop switch 16 (PWM enable) is in a separate relay module. The switch 28 of the delay circuit is in the same switch module with the quick-stop switch 16. When current starts to be supplied to the control coil 29 of the relay module comprising the quick-stop switch via the serial connection 3 of the safety switches, the quick-stop switch 16 as well as the switch 28 of the delay circuit close. In this case the coil 27 of the contactor module 26 functioning as a delay circuit receives a control, and the normally-open switches 13, 14 fitted to the intermediate circuit close and also the normally-closed switches 15 fitted between the phases of the motor open, and at the same time the switch 23 that permits starting and the brake control switch 25 close. The frequency converter receives information about the closing of its power supply circuit by reading the status of the switch 23 that permits starting. After this the frequency converter can start to control the electric motor 2 by controlling the inverter rectifier 8 as well as by controlling the second brake control switch 25, in which case the brake 4 opens.

If any of the safety switches 3 connected in series opens, the current supply to the control coil of the relay module of the quick-stop switch 16 disconnects, in which case first the quick-stop switch 16 and the switch 28 of the delay circuit open. At the same time control of the switches of the inverter rectifier 8 is prevented and the current supply to the motor is disconnected. Opening of the switch 28 of the delay circuit causes disconnection of the current supply of the control coil of the contactor module 26, in which case the normally-open switches fitted to the intermediate circuit open as they are de-energized, simultaneously the normally-closed switches connected in parallel between the phases of the motor short-circuit the de-energized phases of the motor. Further, the switch 23 that permits starting opens, at the same time the brake control switch 25 incorporated in the contactor module opens, in which case the brake 4 switches on.

The present invention is further described by the aid of a few examples of its embodiment. It is however obvious to the person skilled in the art that the invention is not limited to the embodiments described above, but that many adaptations and different embodiments of the invention are possible within the scope of the inventive concept defined by the claims presented below.

The invention claimed is:

1. An AC or DC electric motor drive, comprising:
safety switches determined by the safety of the electric motor drive,
a controlled mechanical brake, as well as a power supply circuit of the brake control,
a power converter having a network rectifier and a power rectifier of the motor, which power rectifier of the motor is at least partly implemented with controlled semiconductor switches arranged into a bridge, and an intermediate circuit between the network rectifier and the power rectifier of the motor, and
a switch arrangement including two normally-open switches in the intermediate circuit of the power converter, of which a first switch is connected in series to the positive intermediate circuit busbar between the output of the network rectifier and the input of the power rectifier of the motor, and a second switch is connected in series to the negative intermediate circuit busbar between the output of the network rectifier and the input of the power rectifier of the motor,
wherein the power rectifier of the motor includes:
a quick-stop switch, and
an amplifier circuit connected to the control pole of the controlled semiconductor switch, the electricity supply of which is arranged to occur via the aforementioned quick-stop switch, and
wherein the semiconductor switches are fitted to switch into a conductive state when the amplifier circuit is in a controlled active state, and
wherein the amplifier circuit supplied via the aforementioned quick-stop switch is fitted alternatively either in connection with the controlled semiconductor switches connected to the positive intermediate circuit busbar, in connection with the controlled semiconductor switches connected to the negative intermediate circuit busbar or in connection with the controlled semiconductor switches connected to both the positive and the negative intermediate circuit busbar.

2. An electric motor drive according to claim 1, wherein the switch arrangement includes normally-closed switches connected in parallel between the phases of the motor.

3. An electric motor drive according to claim 1, wherein the power converter is a frequency converter and the power rectifier of the motor is an inverter rectifier, and
wherein the frequency converter includes a network rectifier, an inverter rectifier and an intermediate circuit between these.

4. An electric motor drive according to claim 1, wherein the power rectifier comprises measurement of the status of the safety switch, measurement of the status of the quick-stop switch, a control of the semiconductor switches of the power rectifier of the motor, a control of the normally-open switches fitted to the intermediate circuit as well as possibly a measurement of the intermediate circuit current, and in that the power converter is fitted to disconnect control of the aforementioned normally-open switches fitted to the intermediate circuit when at least one of the following conditions is fulfilled:

measurement of the status of the quick-stop switch indicates that the switch has opened, measurement of the intermediate circuit current indicates that the absolute value of the intermediate circuit current has decreased to below the pre-defined limit value of current measurement of the status of the safety switch of the electric motor drive indicates that the safety switch has opened the power converter has disconnected current in the power rectifier of the motor with the control of the semiconductor switches of the power rectifier.

5. An electric motor drive according to claim 1, wherein the power rectifier of the motor comprises a switch that permits starting, the power converter comprises measurement of the status of the switch that permits starting, and wherein the power converter is fitted to start the supply of current to the electric motor by controlling the semiconductor switches of the power rectifier of the motor on the basis of the measurement of the status of the switch that permits starting.

6. An electric motor drive according to claim 1, wherein the power supply circuit of the brake control comprises a DC rectifier, in the input of which is a power source and to the output of which is fitted the coil of a mechanical brake, and wherein at least one controlled brake control switch is connected in series to the power supply circuit of the brake control, the power converter comprises a control of the aforementioned controlled brake control switch and in that the power converter is fitted to read the status of at least one safety switch and on the basis of the switch read to control the aforementioned controlled brake control switch.

7. An electric motor drive according to claim 1, wherein the aforementioned normally-open switches fitted to the intermediate circuit, the normally-closed switches fitted between the phases of the motor, the brake control switches, the switch that permits starting as well as the quick-stop switch form one or more switch modules, such as relay modules or contactor modules, of which each switch module has a common control coil, and wherein the switches of the switch module are fitted to open or to close according to the control of the aforementioned common control coil.

8. An electric motor drive according to claim 7, wherein at least the normally-closed switches fitted between the phases of the motor, the normally-open switches fitted to the intermediate circuit, the switch that permits starting and the brake control switch belong to the same switch module.

9. An electric motor drive according to claim 7 or 8, wherein the power converter comprises a control of the switch module and in that the power converter is fitted to read the status of at least one safety switch and to control at least one control coil of the switch module on the basis of the status of the safety switch.

10. An electric motor drive according to claim 7 or 8, wherein the electric motor drive comprises a delay circuit, at least two safety switches are connected in series, the control coil of the quick-stop switch is connected directly to the serial circuit of the safety switches and in that the switch module containing the normally-closed switches fitted between the phases of the motor, the normally-open switches fitted to the intermediate circuit, the switch that permits starting as well as the brake control switch is controlled via the delay circuit.

11. An electric motor drive according to claim 1, wherein the aforementioned drive is an elevator motor drive.

12. An electric motor drive according to claim 2, wherein the aforementioned power converter is a frequency converter and in that the aforementioned power rectifier of the motor is an inverter rectifier, and in that the frequency converter comprises a network rectifier, an inverter rectifier and an intermediate circuit between these.

13. An electric motor drive according to claim 2, wherein the power rectifier comprises measurement of the status of the safety switch, measurement of the status of the quick-stop switch, a control of the semiconductor switches of the power rectifier of the motor, a control of the normally-open switches fitted to the intermediate circuit as well as possibly a measurement of the intermediate circuit current, and in that the power converter is fitted to disconnect control of the aforementioned normally-open switches fitted to the intermediate circuit when at least one of the following conditions is fulfilled:

measurement of the status of the quick-stop switch indicates that the switch has opened, measurement of the intermediate circuit current indicates that the absolute value of the intermediate circuit current has decreased to below the pre-defined limit value of current measurement of the status of the safety switch of the electric motor drive indicates that the safety switch has opened the power converter has disconnected current in the power rectifier of the motor with the control of the semiconductor switches of the power rectifier.

14. An electric motor drive according to claim 3, wherein the power rectifier comprises measurement of the status of the safety switch, measurement of the status of the quick-stop switch, a control of the semiconductor switches of the power rectifier of the motor, a control of the normally-open switches fitted to the intermediate circuit as well as possibly a measurement of the intermediate circuit current, and in that the power converter is fitted to disconnect control of the aforementioned normally-open switches fitted to the intermediate circuit when at least one of the following conditions is fulfilled:

measurement of the status of the quick-stop switch indicates that the switch has opened, measurement of the intermediate circuit current indicates that the absolute value of the intermediate circuit current has decreased to below the pre-defined limit value of current measurement of the status of the safety switch of the electric motor drive indicates that the safety switch has opened the power converter has disconnected current in the power rectifier of the motor with the control of the semiconductor switches of the power rectifier.

15. An electric motor drive according to claim 2, wherein the power rectifier of the motor comprises a switch that permits starting, the power converter comprises measurement of the status of the switch that permits starting, and in that the power converter is fitted to start the supply of current to the electric motor with by controlling the semiconductor switches of the power rectifier of the motor on the basis of the measurement of the status of the switch that permits starting.

16. An electric motor drive according to claim 3, wherein the power rectifier of the motor comprises a switch that permits starting, the power converter comprises measurement of the status of the switch that permits starting, and in that the power converter is fitted to start the supply of current to the electric motor with by controlling the semiconductor switches of the power rectifier of the motor on the basis of the measurement of the status of the switch that permits starting.

17. An electric motor drive according to claim 4, wherein the power rectifier of the motor comprises a switch that permits starting, the power converter comprises measurement of the status of the switch that permits starting, and in that the power converter is fitted to start the supply of current to the electric motor with by controlling the semiconductor switches of the power rectifier of the motor on the basis of the measurement of the status of the switch that permits starting.

18. An electric motor drive according to claim 2, wherein the power supply circuit of the brake control comprises a DC rectifier, in the input of which is a power source and to the output of which is fitted the coil of a mechanical brake, and in that at least one controlled brake control switch is connected in series to the power supply circuit of the brake control, the power converter comprises a control of the aforementioned controlled brake control switch and in that the power converter is fitted to read the status of at least one safety switch and on the basis of the switch read to control the aforementioned controlled brake control switch.

19. An electric motor drive according to claim 3, wherein the power supply circuit of the brake control comprises a DC rectifier, in the input of which is a power source and to the output of which is fitted the coil of a mechanical brake, and in that at least one controlled brake control switch is connected in series to the power supply circuit of the brake control, the power converter comprises a control of the aforementioned controlled brake control switch and in that the power converter is fitted to read the status of at least one safety switch and on the basis of the switch read to control the aforementioned controlled brake control switch.

20. An electric motor drive according to claim 4, wherein the power supply circuit of the brake control comprises a DC rectifier, in the input of which is a power source and to the output of which is fitted the coil of a mechanical brake, and in that at least one controlled brake control switch is connected in series to the power supply circuit of the brake control, the power converter comprises a control of the aforementioned controlled brake control switch and in that the power converter is fitted to read the status of at least one safety switch and on the basis of the switch read to control the aforementioned controlled brake control switch.

* * * * *